US008364828B2

(12) United States Patent
Samavedam et al.

(10) Patent No.: US 8,364,828 B2
(45) Date of Patent: Jan. 29, 2013

(54) SIP-BASED CALL SESSION SERVER AND MESSAGE-ROUTING METHOD

(75) Inventors: Sai Samavedam, Lafayette, CO (US); Kevin Cunningham, Longmont, CO (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 395 days.

(21) Appl. No.: 12/837,951

(22) Filed: Jul. 16, 2010

(65) Prior Publication Data

US 2012/0016996 A1 Jan. 19, 2012

(51) Int. Cl.
G06F 15/16 (2006.01)

(52) U.S. Cl. ........ 709/227; 709/206; 709/223; 709/224; 709/230; 709/238

(58) Field of Classification Search .................. 709/206, 709/223, 224, 227, 230, 238
See application file for complete search history.

(56) References Cited

U.S. PATENT DOCUMENTS

| 7,606,914 | B2 * | 10/2009 | Ikeda et al. | 709/228 |
|---|---|---|---|---|
| 7,937,463 | B2 * | 5/2011 | Chadli | 709/224 |
| 8,082,580 | B1 * | 12/2011 | Desai et al. | 726/14 |
| 8,140,707 | B2 * | 3/2012 | Lee et al. | 709/245 |
| 2007/0058533 | A1 | 3/2007 | Forissier et al. | |
| 2009/0067408 | A1 * | 3/2009 | Leppainen et al. | 370/350 |
| 2009/0111427 | A1 * | 4/2009 | Mack et al. | 455/411 |
| 2009/0150562 | A1 * | 6/2009 | Kim et al. | 709/238 |
| 2009/0193117 | A1 * | 7/2009 | Oh | 709/224 |
| 2010/0057853 | A1 * | 3/2010 | Xu et al. | 709/204 |
| 2010/0169483 | A1 * | 7/2010 | Jalkanen | 709/224 |
| 2011/0296034 | A1 * | 12/2011 | Mayer et al. | 709/227 |

OTHER PUBLICATIONS

Pankaj Jairath et al: "Mechanism of load balancing HTTP and SIP requests using Converged Load Balancer", Research Disclosure, Mason Publications, Hampshire, GB, vol. 539, No. 20, Mar. 1, 2009, XP007138818, ISSN: 0374-4353.

* cited by examiner

Primary Examiner — Liangche A Wang

(57) ABSTRACT

A method and SIP-based Call Session Server for routing SIP messages. A Network and Transport layer receives an incoming SIP message and forwards it to one of a plurality of SIP message routing process instances in a SIP Message Routing Framework. The receiving SIP message routing process instance determines a Routing-Key based upon at least one header field in the incoming message, and based upon the Routing-Key, forwards the incoming message to a selected one of a plurality of Back-to-Back User Agent (B2BUA) instances in a Call Session Control Framework. The selected B2BUA instance creates an outgoing SIP message utilizing the Routing-Key to generate a From-Tag in an outgoing request message, or to generate a To-Tag in an outgoing response message, and then forwards the outgoing message to the Network and Transport layer, which transmits the outgoing message.

8 Claims, 4 Drawing Sheets

SIP-BASED CALL SESSION SERVER AND MESSAGE-ROUTING METHOD

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to communication systems. More particularly, and not by way of limitation, the present invention is directed to a Session Initiation Protocol (SIP)-based Call Session Server and a method of routing messages within the server.

A resilient, distributed, and load-balanced SIP-based Call Session Server, such as a high capacity IP Multimedia Subsystem IMS-CSCF node, may implement a Call Session Control Function (CSCF). The server is designed to handle many simultaneous one-to-one calls and conference calls, while providing its services via only one or a few advertised external interfaces (for example the SIP standard port 5060 and a few designated IP addresses). The CSCF creates multiple Back-to-Back User Agent (B2BUA) instances on possibly multiple processor elements for handling the calls simultaneously, and is typically designed to process not only calls conforming to the standard SIP protocol (RFC3261), but also calls based on variants and/or extensions of the RFC3261 standard, some of which may be proprietary. The CSCF may also need to simultaneously (within the same call session) support a combination of pure RFC3261 calls and calls based on multiple variants and/or extensions of RFC3261. The CSCF may also use a SIP-based protocol for controlling call-related resources. For example, a CSCF acting as a media gateway controller can control the media resources in a multimedia gateway/server using a SIP-based protocol.

When multiple B2BUA instances are created on multiple processor elements behind a limited set of external interfaces to handle multiple simultaneous calls, signaling messages coming in from external nodes must be correlated and routed to the correct B2BUA instance for each call. In order to achieve this, the CSCF usually implements a call-session-aware SIP message routing framework. That is, for every call, the SIP message routing framework must share all of the call session information (such as the values of message parameters generated by a B2BUA instance) with the corresponding B2BUA instance.

The existing solutions for SIP message routing in the typical implementations of the Call Session Server's CSCF functions rely on the "Call-ID", the "branch", and/or the "tag" parameters in the SIP protocol message headers. RFC3261 requires these parameters to be to be random and unique in length, space, and time. When one gateway generates these parameters for outgoing requests, the remote/peer gateways involved in the call session are required to echo them back in some form in the incoming responses to the Call Session Server.

A typical CSCF generates various SIP message parameters such as the Call-ID, branch, and tag parameters as arbitrary strings of arbitrary lengths, so that they are unique and random in space and time, and across multiple calls. However, due to the nature of the generation process and randomness of the various parameters, they usually do not have any distinctive properties or patterns that can be used by the message-routing framework to correlate the messages with the call sessions and determine the corresponding B2BUA instance within the CSCF to which the message is to be routed. Therefore, in order to aid the routing framework in correlating and routing the SIP messages, the various parameters generated for every call session by its B2BUA instance are shared with the SIP message-routing framework. However, the values of the various parameters of a call session might have little or no correlation with each other. Moreover, the existence and values of the parameters also depend on the state of the call session in the state-machine, which can be call-leg specific, and whether a call-leg is compliant with the pure RFC3261 or a variant/extension thereof. Therefore, in order to utilize the parameter values effectively to correlate and route the messages, common substrings are incorporated into the parameter values across multiple headers, and the call state information is also shared between the B2BUA and routing layer.

The information sharing between the B2BUA instances and the routing framework is typically done using Inter-process Communication (IPC) mechanisms and/or a distributed database. At the routing framework, the use of the database also provides resiliency, fault tolerance, and load balancing with the parameters of the call sessions inserted into call session records and checked into the distributed database, which is replicated across all processors in the node (also known as total replication). The routing framework is designed to consist of multiple routing process instances, with redundancy, spread across multiple processor elements. The B2BUA instances and the routing framework store and retrieve the call session records from the database on any processor.

The use of common substrings in the parameter values and information sharing between the B2BUA instances and the SIP message routing framework, when attempting to make the routing framework call-session-aware, present significant design problems. The problems fall into three main categories. First, the procedures lead to inefficiencies in both the B2BUA layer and the routing framework within the CSCF due to the significant overhead and complexity of call session information sharing and maintenance between the two layers. Second, since the routing framework is forced to maintain the call session information for every call (for resiliency, fault tolerance, and load balancing), if one instance of the routing process crashes, the session information of all the affected call sessions must be moved to another routing process, possibly on another processor element. This also involves saving and retrieving the call session information of the affected calls in a distributed database. However, this incurs a significant overhead and cost in routing process management and database management in the signaling plane. In addition, when a failure occurs in the routing framework, the B2BUA instances of the affected call sessions must be re-associated with the new routing process instances, and there is additional overhead incurred for managing the associations. This wastes processor and memory resources and increases the call processing latency, negatively impacting the performance and capacity of the system, while making the overall design of the CSCF complex, and therefore expensive.

Third, the SIP message header parameters such as Call-ID, branch, and tag cannot always be relied upon for uniqueness and randomness while, at the same time, also bearing distinctive properties in the substring portions to identify a call session. This is because if the substrings of the random parameter value strings are used as common substrings and mixed with other random strings of the SIP header parameters, then the overall entropy of the SIP header parameter strings is destroyed, leading to a higher probability of collisions at the routing framework. This leads to misrouting of the messages, especially under high call volume, as the probability of collisions rises with the number of messages. Thus, the use of common substrings of SIP message header parameters in a manner that renders the SIP header values collision-prone violates the randomness requirements of RFC3261. Also, such a scheme may not work at all when the variants/extensions of RFC3261 are to be supported, especially along with the pure RFC3261-based signaling within the same call session. The variants and extensions of the SIP standard could place additional constraints on the various parameter values, or could modify the existing constraints (per RFC3261), or could use the parameter values for a totally non-standard purpose.

BRIEF SUMMARY OF THE INVENTION

The present invention presents a novel approach to SIP-based message routing within a SIP-based Call Session Server implementing a Call Session Control Function (CSCF), such as an IMS-CSCF node. The invention eliminates the need for the message routing framework in the CSCF to be call-session-aware for correctly routing the SIP messages in and out of the node. By using this approach, the routing framework can be designed to be algorithmic and therefore efficient, resilient, fault tolerant, and highly suitable for deployment in distributed and load-balanced node architectures.

The present invention has the following features:

1. Elimination of the need for call session awareness in the SIP call session message routing framework of a SIP-based Call Session Server/IMS-CSCF.

2. Algorithmic SIP message correlation and routing based on a stochastically generated session identifier, henceforth referred to as the "Routing-Key" in the remainder of this application.

3. The use of stochastically generated session identifier (Routing-Key) based on the most common SIP headers such as Call-ID, From-tag, and To-Tag (the values of which are also guaranteed to be unique in time, space, and across multiple call sessions) for generating the parameter values in a way that does not break their entropy. The Call-ID, From-Tag, and To-Tag headers are the most common header found in SIP messages per the SIP standard and its variants and extensions, and are therefore the basis for generating the Routing-Key.

4. Keeping the call session information only within the session control layer (CSCF/B2BUA instances) with no need to explicitly share with the message routing framework.

5. Repeatable logic that does not need persistent caching of the call session information in a database at the routing framework to achieve fault tolerance and resiliency.

6. Location-independent (i.e., processor element and routing process independent) SIP message correlation and routing, leading to a highly optimized, load-balanced, and scalable routing solution. There is no dedicated routing process instance for a call session.

In one embodiment, the present invention is directed to a method of routing SIP messages within a SIP-based Call Session Server, the SIP messages being associated with a call session. The method includes the steps of receiving by the SIP Server, an incoming SIP message from an originating node; determining by the SIP Server, a Routing-Key based upon at least one header field in the incoming SIP message; utilizing the Routing-Key to identify by the SIP Server, a Back-to-Back User Agent (B2BUA) instance responsible for the call session; sending the incoming SIP message to the identified B2BUA instance; creating an outgoing SIP message by the B2BUA instance, wherein the B2BUA instance utilizes the Routing-Key to generate a header field in the outgoing SIP message; and sending the outgoing SIP message from the SIP Server to a terminating node.

In another embodiment, the present invention is directed to a method of routing SIP messages within a SIP-based Call Session Server. The method includes the steps of receiving in a Network and Transport layer, an incoming SIP message from an originating node; and forwarding the incoming SIP message by the Network and Transport layer to one of a plurality of SIP message routing process instances in an algorithmic SIP Message Routing Framework that is not call-session-aware, wherein the Network and Transport layer load-balances incoming SIP messages on a per-message basis across the plurality of SIP message routing process instances. The receiving SIP message routing process instance determines a Routing-Key based upon at least one header field in the incoming SIP message. The SIP Message Routing Framework then forwards the incoming SIP message to a selected one of a plurality of B2BUA instances in a Call Session Control Framework based upon the Routing-Key, wherein the SIP Message Routing Framework load-balances incoming SIP messages on a per-call-session basis across the plurality of B2BUA instances. The method also includes creating an outgoing SIP message by the selected B2BUA instance, wherein the B2BUA instance utilizes the Routing-Key to generate a header field in the outgoing SIP message dependent upon a type of the outgoing SIP message; forwarding the outgoing SIP message to the Network and Transport layer via the SIP Message Routing Framework; and sending the outgoing SIP message from the SIP Server to a terminating node.

In another embodiment, the present invention is directed to a SIP-based Call Session Server for routing SIP messages. The SIP Server includes a Network and Transport layer for receiving an incoming SIP message from an originating node and for sending an outgoing SIP message to a terminating node; an algorithmic SIP Message Routing Framework in communication with the Network and Transport layer, the SIP Message Routing Framework including a plurality of SIP message routing process instances; and a Call Session Control Framework in communication with the SIP Message Routing Framework, the Call Session Control Framework including a plurality of Back-to-Back User Agent (B2BUA) instances. The Network and Transport layer forwards the incoming SIP message to one of the plurality of SIP message routing process instances in the SIP Message Routing Framework, wherein the Network and Transport layer load-balances incoming SIP messages on a per-message basis across the plurality of SIP message routing process instances. The receiving SIP message routing process instance determines a Routing-Key based upon at least one header field in the incoming SIP message, and based upon the Routing-Key, forwards the incoming SIP message to a selected one of the plurality of B2BUA instances in the Call Session Control Framework, wherein the SIP Message Routing Framework load-balances incoming SIP messages on a per-call-session basis across the plurality of B2BUA instances. The selected B2BUA instance creates an outgoing SIP message utilizing the Routing-Key to generate a header field in the outgoing SIP message dependent upon a type of the outgoing SIP message, and then forwards the outgoing SIP message to the Network and Transport layer via the SIP Message Routing Framework. The Network and Transport layer sends the outgoing SIP message to the terminating node.

Taken together, the processes of the present invention reduce call processing latency and reduce CPU overhead, thereby improving capacity. The routing framework readily supports load balancing, resiliency, and fault tolerance. Any message for any call session can be handled by any routing process, but is still routed correctly towards the correct B2BUA instance. All routing processes execute the identical logic algorithmically without caching or storing/retrieving any information, making the routing framework fault tolerant. The invention also easily handles SIP extensions and variations since the parameter values are based on the commonly used Call-ID, From-Tag, and To-Tag headers.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

In an exemplary embodiment, the message-routing method of the present invention comprises three processes:

Process No. 1: An overall process for algorithmic correlation and stateless routing of the SIP messages within a SIP server. This involves generating or retrieving a session identifier, referred to as a "Routing-Key", from the incoming SIP messages (per Process 2); identifying the correct B2BUA instance responsible for the call session to which the SIP message belongs; and sending the incoming SIP message, along with the Routing-Key, to the identified B2BUA instance; and generating the appropriate parameters of the outgoing SIP messages based on the Routing-Key (per Process 3).

Process No. 2: A process for generating or retrieving the Routing-Key based on the parameters of the incoming SIP message.

Process No. 3: A process for generating certain specific SIP message parameter values using the Routing-Key.

Figure 1:
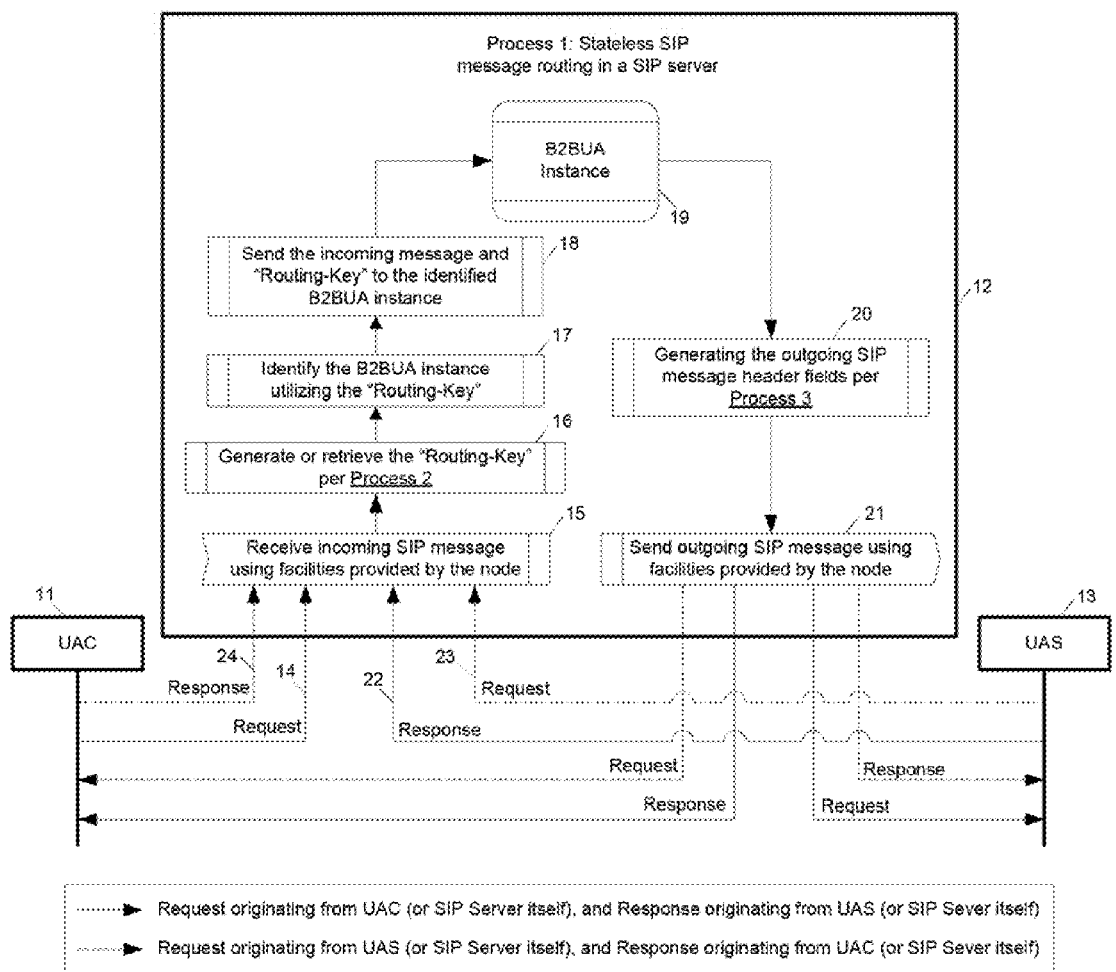
FIG. 1 is a flow chart illustrating the steps of an exemplary embodiment of Process No. 1.

FIG. 1 is a flow chart illustrating the steps of an exemplary embodiment of the overall Process No. 1. Messages are shown in a SIP transaction between a User Agent Client (UAC) 11, a SIP Server 12, and a User Agent Server (UAS) 13. The UAC creates a SIP request message 14 and sends it to the SIP Server. At step 15, the SIP Server receives the incoming message utilizing facilities provided by the node on which the server resides. At step 16, the server retrieves or generates a Routing-Key utilizing the procedures of Process 2. At step 17, the server identifies the B2BUA instance responsible for the call session utilizing the Routing-Key. At step 18, the server sends the incoming message and Routing-Key to the identified B2BUA instance 19, which generates an outgoing SIP message. At step 20, the server generates the outgoing SIP message header fields utilizing the procedures of Process 3. At step 21, the server sends the outgoing SIP message to the UAS 13 utilizing the facilities provided by the node on which the server resides. The same process is followed when the UAS 13 generates a SIP response message 22, which is routed through the server to the UAC 11. The same process is also followed when the UAS 13 generates a SIP request message 23, which is routed through the server to the UAC 11, as well as when the UAC 11 generates a SIP message response 24 which is routed through the sever to the UAS 13.

Figure 2:
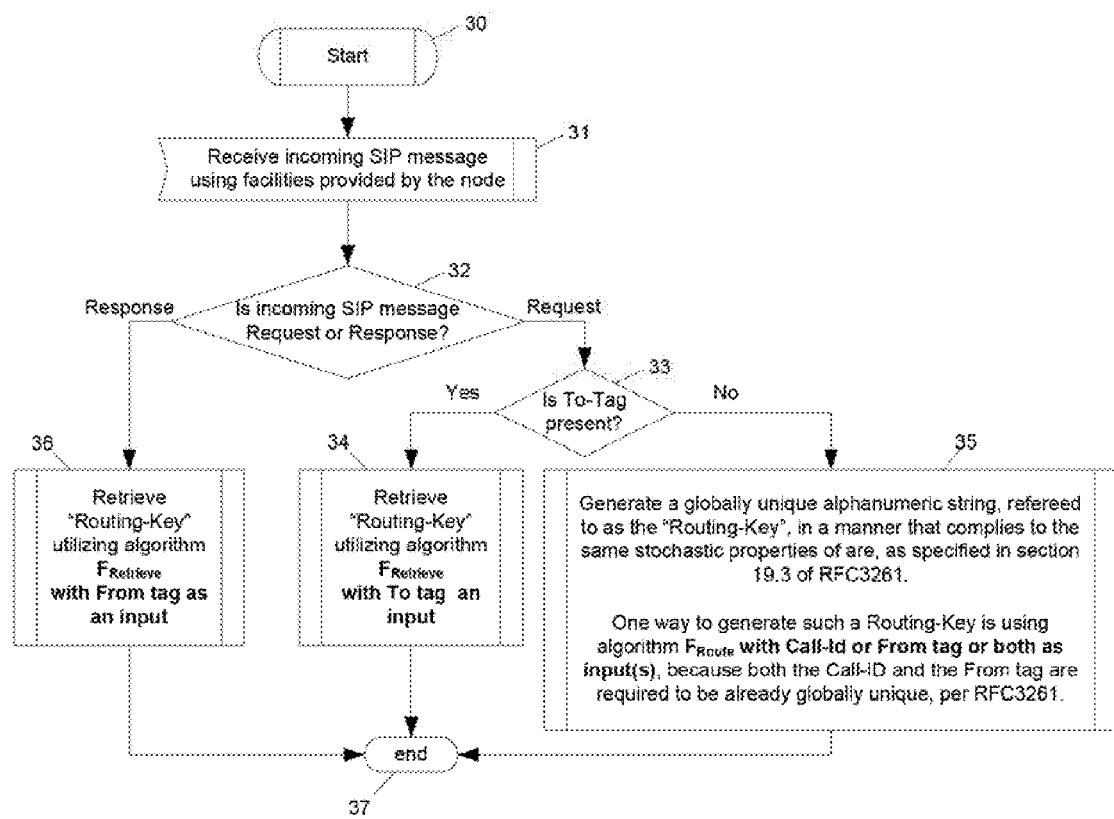
FIG. 2 is a flow chart illustrating the steps of an exemplary embodiment of Process No. 2.

FIG. 2 is a flow chart illustrating the steps of an exemplary embodiment of Process No. 2. In this process, the SIP Server 12 generates or retrieves the Routing-Key based on the parameters of the incoming SIP message. The process starts at step 30 and moves to step 31 where the SIP Server receives the incoming message utilizing facilities provided by the node on which the server resides. At step 32, it is determined whether the incoming message is a request 14 (or 23) or a response 22 (or 24). If the message is a request, the process moves to step 33 where it is determined whether a To-Tag is present. If a To-Tag is present, the process moves to step 34 where the server retrieves the Routing-Key utilizing the retrieval algorithm $F_{Retrieve}$ with the To-Tag as an input, as described below. The process then ends at step 37. However, if a To-Tag is not present, the process moves to step 35 where the server generates a globally unique alphanumeric string, referred to as the Routing-Key, in a manner that complies with the stochastic properties of tags, per section 19.3 of RFC3261. In one embodiment, the Routing-Key is generated utilizing the algorithm $F_{Route}$ with the Call-ID or From-Tag or both as inputs, as described below. The process then ends at step 37.

However, if it is determined at step 32 that the incoming message is a response, the process moves to step 36 where the server retrieves the Routing-Key utilizing the retrieval algorithm $F_{Retrieve}$ with the From-Tag as an input, as described below. The process then ends at step 37.

Figure 3:
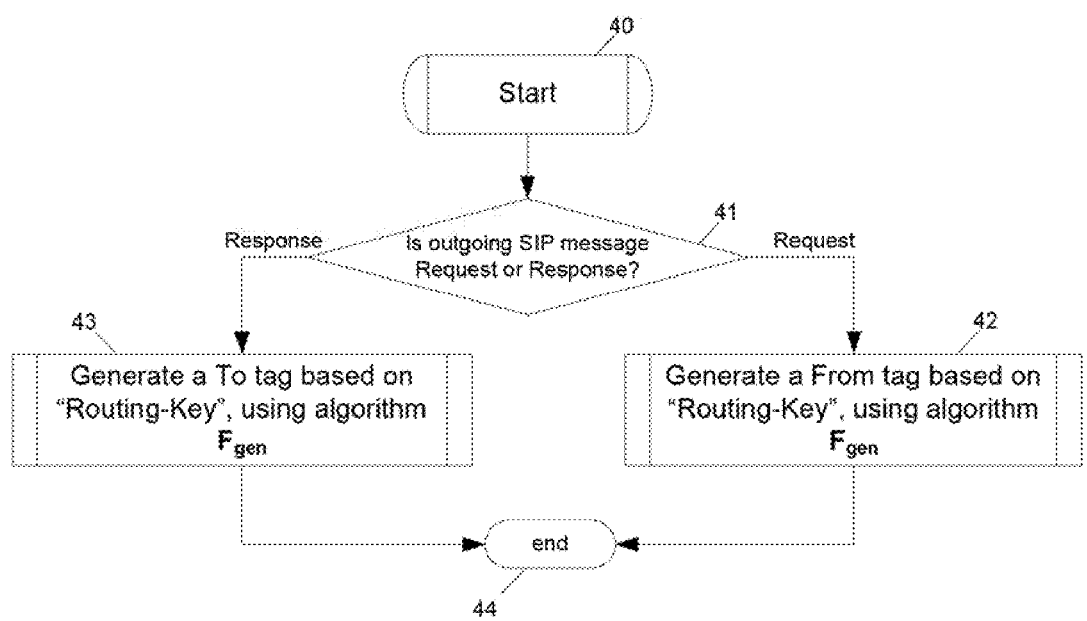
FIG. 3 is a flow chart illustrating the steps of an exemplary embodiment of Process No. 3.

FIG. 3 is a flow chart illustrating the steps of an exemplary embodiment of Process No. 3. In this process, the SIP Server 12 generates certain specific SIP message parameter values for the outgoing SIP messages using the Routing-Key. The process starts at step 40 and moves to step 41 where the server determines whether the outgoing message is a request or a response. If the message is a request, the process moves to step 42 where a From-Tag is generated based on the Routing-Key using the generation algorithm $F_{gen}$ described below. The process then ends at step 44. However, if it is determined at step 41 that the outgoing message is a response, the process moves to step 43 where the server generates a To-Tag based on the Routing-Key using the generation algorithm $F_{gen}$ described below. The process then ends at step 44.

In one embodiment, the $F_{gen}$ and $F_{Retrieve}$ methods are a pair of algorithms that are algorithmic and/or mathematical inverses of each other. In the examples of $F_{gen}$ and $F_{Retrieve}$ below:

The output of the $F_{Gen}$ algorithm will be the From-Tag or To-Tag.

The output of the $F_{Retrieve}$ algorithm will be the retrieved Routing-Key.

Examples of the algorithms $F_{Retrieve}$ and $F_{Gen}$ used in Processes 2 and 3:

EXAMPLE 1

$F_{Gen}$ can be: AES-encryption (Routing-Key, p), where p is the pass phrase used for encryption.

$F_{Retrieve}$ must be: AES-decryption (T, p), where T is either the From-Tag or the To-Tag, and p is the pass phrase for decryption.

EXAMPLE 2

$F_{Gen}$ can be: Given the Routing-Key is of length N, generate a random alphanumeric character string and prepend the Routing-key to it such that the result has the Routing-Key as the first N characters.

$F_{Retrieve}$ must be: Collect the first N characters of the From-Tag or the To-Tag.

EXAMPLE 3

$F_{Gen}$ can be: Generate an arbitrary alphanumeric character string of length equal to the Routing-Key, and then interleave the Routing-Key into it, such that, the even numbered position characters of the resultant string are those of the Routing-Key.

$F_{Retrieve}$ must be: Collect all the even numbered position characters from the From-Tag or the To-Tag, and concatenate the collected characters.

Examples of the Algorithm $F_{Route}$ Used in the Method 2:

In the examples below, the output of the $F_{Route}$ algorithm, which takes the Call-ID and/or the From-Tag of the incoming SIP request message, is the generated Routing-Key.

EXAMPLES $F_{Route}$ can be: Use Call-ID or From-Tag as is.

$F_{Route}$ can be: Concatenate Call-ID and From-Tag.

$F_{Route}$ can be: MD5(Call-ID).

$F_{Route}$ can be: SHA-1(Call-ID+To-Header), where "+" means concatenation.

$F_{Route}$ can be: MD5(From-Tag+R-URI), where "+" means concatenation.

$F_{Route}$ can be: SHA-1(From-Tag+R-URI+Branch parameter), where "+" means concatenation.

$F_{Route}$ can be: TwoFish(From-Tag).

$F_{Route}$ can be: SHA-1(entire SIP message), since the SIP message already contains the Call-ID and the From-Tags.

$F_{Route}$ can be: AES(Call-ID+random string+timestamp), where "+" means concatenation.

$F_{Route}$ can be: TripleDES(Call-ID+random string+node name), where "+" means concatenation.

$F_{Route}$ can be: (Call-ID+node IP address with dots removed), where "+" means concatenation.

$F_{Route}$ can be: (Call-ID+timestamp+hardware MAC address of the board that received the SIP message), where "+" means concatenation.

Processes 1, 2, and 3 are described below utilizing a generalized architecture of a SIP Call Session Server/IMS CSCF node implementation, which is based on the SIP message routing methodology of the present invention.

Figure 4:
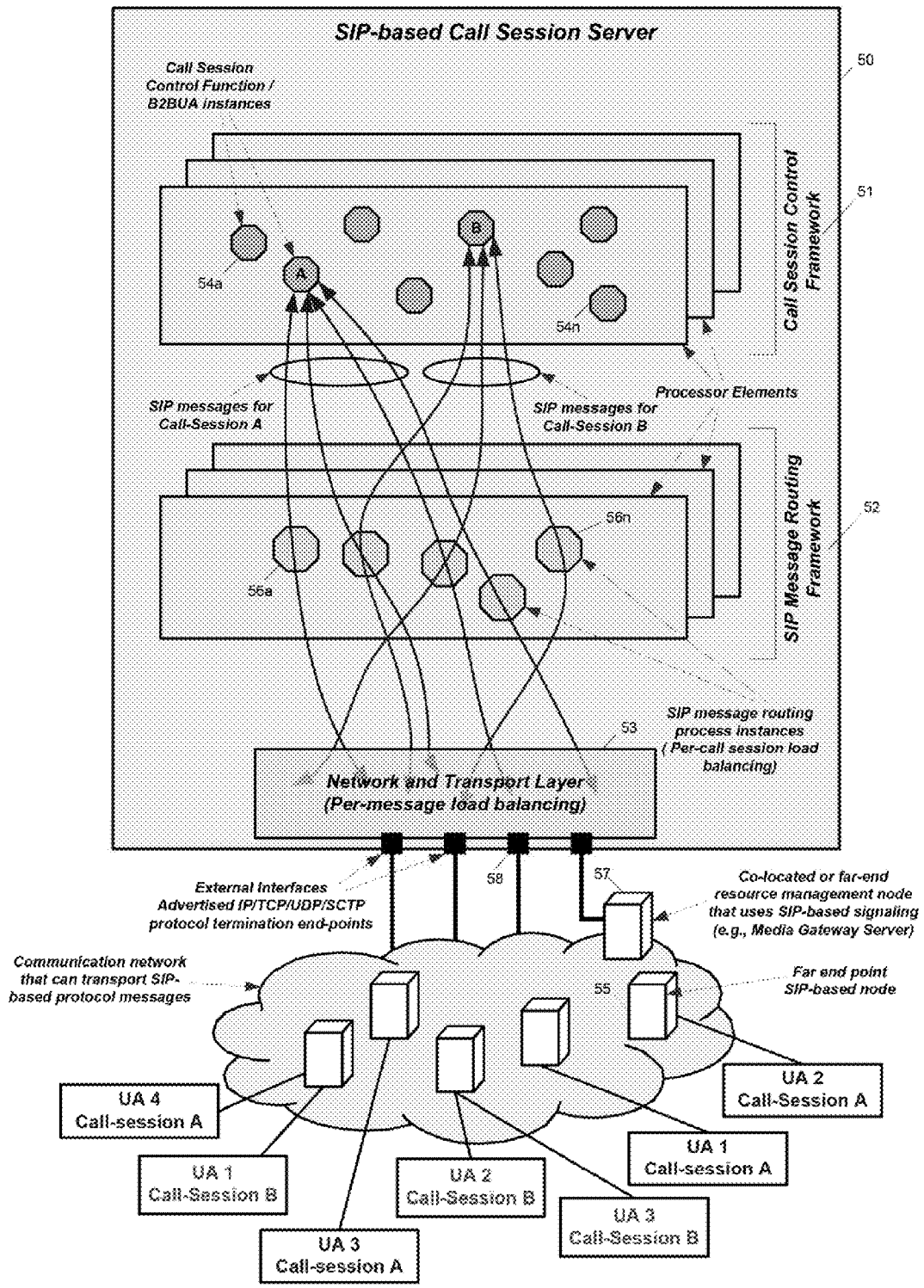
FIG. 4 is a simplified block diagram of a SIP Call Session Server/IMS-CSCF node illustrating exemplary message routing for two call sessions in an embodiment of the present invention.

FIG. 4 is a simplified block diagram of a SIP Call Session Server/IMS-CSCF node 50 illustrating exemplary message routing for two call sessions in an embodiment of the present invention. The sessions are marked A and B. The node includes three layers: the Call Session Control Framework 51, the SIP Message Routing Framework 52, and the Network and Transport layer 53.

The Call Session Control Framework 51 includes a pool of CSCF/B2BUA instances 54a-54n, with one instance dedicated per call session. The Call Session Control Framework is responsible for processing and generating the SIP messages per the RFC 3261 or its variations and extensions. The Call Session Control Framework is also responsible for generating specific unique SIP message header fields for the outgoing messages based on the incoming initial call setup messages. The header fields for the outgoing messages are generated in such a way that when those header fields are echoed back by far-end point SIP-based nodes 55, or by any co-located or far-end resource management node 57 (such as a media gateway server) that provides its services using a SIP-based signaling protocol, in the incoming SIP messages, the routing process instances 56a-56n in the SIP Message Routing Framework 52 can algorithmically route the incoming messages to the correct CSCF/B2BUA instance 54.

The SIP Message Routing Framework 52 includes a pool of resilient SIP message routing process instances 56a-56n. Each routing process instance is responsible for per-call session load-balancing of incoming SIP messages across the pool of CSCF/B2BUA process instances 54a-54n. The routing process instances are not dedicated per call, but route the incoming SIP messages based on the header field content of the messages. Any SIP message can be algorithmically routed by any routing process. The SIP Message Routing Framework is also responsible for forwarding the outgoing messages to the Network and Transport layer 53. The SIP Message Routing Framework is SIP-based protocol aware but not call-session aware.

The Network and Transport layer 53 includes resilient IP/TCP/UDP/SCTP protocol termination end points 58. The Network and Transport layer is responsible for per-message load balancing of the incoming traffic across the pool of SIP message routing process instances 56a-56n in the SIP Message Routing Framework 52. The Network and Transport layer is also responsible for routing outgoing traffic towards the correct destination nodes 55 or 57.

In the manner described above, the present invention utilizes algorithmic routing of the SIP messages at the routing layer, made feasible by the processes for generating the message parameters. Together, these processes eliminate:

The need to explicitly share any call session information between the B2BUA layer and the routing framework layer;

The need for a distributed database to check in any call-session records for resiliency and fault tolerance at the routing framework layer;

The overhead incurred in managing the resources (processor, memory and/or database) for information sharing at the B2BUA layer and the routing framework; and The complexity of designing the B2BUA and the routing framework to achieve fault tolerance (re-associating the B2BUA instances and the routing processes, moving affected call sessions from one routing process to another in case of a failure, using a database to hold the call-session records and total replication of the same across various processor elements in the node).

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of routing Session Initiation Protocol (SIP) messages within a SIP-based Call Session Server, the SIP messages being associated with a call session, the method comprising the steps of:
   receiving by the SIP Server, an incoming SIP message from an originating node;
   determining by the SIP Server, a session identifier (Routing Key) based upon at least one header field in the incoming SIP message, wherein the step of determining the Routing-Key includes:
      determining whether the incoming SIP message is a request message or a response message;
      when the incoming SIP message is a request message and a To-Tag is present, retrieving the Routing-Key utilizing the To-Tag of the incoming SIP message;
      when the incoming SIP message is a request message and the To-Tag is not present, generating the Routing-Key as a globally unique alphanumeric string in a manner that complies with stochastic properties of tags utilizing the Call-ID of the incoming SIP request message, the From-Tag of the incoming SIP request message, or both: and
      when the incoming SIP message is a response message, retrieving the Routing-Key utilizing the From-Tag of the incoming SIP message;
   utilizing the Routing-Key by the SIP Server, to identify a Back-to-Back User Agent (B2BUA) instance responsible for the call session;
   sending the incoming SIP message to the identified B2BUA instance;
   creating an outgoing SIP message by the B2BUA instance, wherein the B2BUA instance utilizes the Routing-Key to generate a header field in the outgoing SIP message; and
   sending by the SIP Server, the outgoing SIP message to a terminating node.

2. The method as recited in claim 1, wherein the steps of retrieving the Routing-Key utilizing the To-Tag of an incoming request message or the From-Tag of an incoming response message include retrieving the Routing-Key utilizing a retrieval algorithm, which is an algorithmic and/or mathematical inverse of a generation algorithm utilized by the SIP server to generate based on the Routing-Key, a header field in an outgoing SIP message.

3. The method as recited in claim 1, wherein the step of creating an outgoing SIP message includes the steps of:
   determining whether the outgoing SIP message is a request message or a response message;
   when the outgoing SIP message is a request message, generating the From-Tag in the outgoing SIP message based on the Routing-Key; and
   when the outgoing SIP message is a response message, generating the To-Tag in the outgoing SIP message based on the Routing-Key.

4. The method as recited in claim 3, wherein the steps of generating the From-Tag of a request message or the To-Tag of a response message include generating the From-Tag or the To-Tag utilizing a generation algorithm, which is an algorithmic and/or mathematical inverse of a retrieval algorithm utilized by the SIP server to retrieve the Routing-Key from the From-Tag or the To-Tag in an incoming SIP message.

5. A method of routing Session Initiation Protocol (SIP) messages within a SIP-based Call Session Server, the method comprising the steps of:
   receiving in a Network and Transport layer, an incoming SIP message from an originating node;
   forwarding the incoming SIP message by the Network and Transport layer to one of a plurality of SIP message routing process instances in an algorithmic SIP Message Routing Framework that is not call-session-aware, wherein the Network and Transport layer load-balances incoming SIP messages on a per-message basis across the plurality of SIP message routing process instances;
   determining by the receiving SIP message routing process instance, a Routing-Key based upon at least one header field in the incoming SIP message, wherein the step of determining the Routing-Key includes:
      determining whether the incoming SIP message is a request message or a response message;
      when the incoming SIP message is a request message and a To-Tag is present, retrieving the Routing-Key utilizing the To-Tag of the incoming SIP message;
      when the incoming SIP message is a request message and the To-Tag is not present, generating the Routing-Key as a globally unique alphanumeric string in a manner that complies with stochastic properties of tags utilizing the Call-ID of the incoming SIP request message, the From-Tag of the incoming SIP request message, or both; and
      when the incoming SIP message is a response message, retrieving the Routing-Key utilizing the From-Tag of the incoming SIP message;
   based upon the Routing-Key, forwarding the incoming SIP message by the SIP Message Routing Framework to a selected one of a plurality of Back-to-Back User Agent (B2BUA) instances in a Call Session Control Framework, wherein the SIP Message Routing Framework load-balances incoming SIP messages on a per-call-session basis across the plurality of B2BUA instances;
   creating an outgoing SIP message by the selected B2BUA instance, wherein the B2BUA instance utilizes the Routing-Key to generate a header field in the outgoing SIP message dependent upon a type of the outgoing SIP message;
   forwarding the outgoing SIP message to the Network and Transport layer via the SIP Message Routing Framework; and
   sending the outgoing SIP message from the SIP Server to a terminating node.

6. The method as recited in claim 5, wherein the step of creating an outgoing SIP message includes the steps of:
   generating a From-Tag in the outgoing SIP message based on the Routing-Key, when the outgoing SIP message is a request message; and
   generating a To-Tag in the outgoing SIP message based on the Routing-Key, when the outgoing SIP message is a response message.

7. A Session Initiation Protocol (SIP)-based Call Session Server for routing SIP messages, the SIP Server comprising:
   a Network and Transport layer for receiving an incoming SIP message from an originating node and for sending an outgoing SIP message to a terminating node;
   an algorithmic SIP Message Routing Framework in communication with the Network and Transport layer, the SIP Message Routing Framework including a plurality of SIP message routing process instances; and
   a Call Session Control Framework in communication with the SIP Message Routing Framework, the Call Session Control Framework including a plurality of Back-to-Back User Agent (B2BUA) instances;

wherein the Network and Transport layer forwards the incoming SIP message to one of the plurality of SIP message routing process instances in the SIP Message Routing Framework, wherein the Network and Transport layer load-balances incoming SIP messages on a per-message basis across the plurality of SIP message routing process instances;

wherein the receiving SIP message routing process instance determines a Routing-Key based upon at least one header field in the incoming SIP message, and based upon the Routing-Key, forwards the incoming SIP message to a selected one of the plurality of B2BUA instances in the Call Session Control Framework, wherein the SIP Message Routing Framework load-balances incoming SIP messages on a per-call-session basis across the plurality of B2BUA instances;

wherein the selected B2BUA instance creates an outgoing SIP message utilizing the Routing-Key to generate a header field in the outgoing SIP message dependent upon a type of the outgoing SIP message;

wherein the selected B2BUA instance forwards the outgoing SIP message to the Network and Transport layer via the SIP Message Routing Framework;

wherein the Network and Transport layer sends the outgoing SIP message to the terminating node; and wherein the receiving SIP message routing process instance includes a processor element programmed to:

retrieve the Routing-Key utilizing a retrieval algorithm with the To-Tag, if present, as an input when the incoming SIP message is a request message, wherein the retrieval algorithm is an algorithmic and/or mathematical inverse of the algorithm utilized by the SIP server to generate the From-Tag in an outgoing SIP request message or the To-Tag in an outgoing SIP response message;

if the To-Tag is not present in the incoming SIP request message, then generate the Routing-Key as a globally unique alphanumeric string in a manner that complies with stochastic properties of tags utilizing the Call-ID of the incoming SIP request message, the From-Tag of the incoming SIP request message, or both; and retrieve the Routing-Key utilizing a retrieval algorithm with the From-Tag as an input when the incoming SIP message is a response message, wherein the retrieval algorithm is an algorithmic and/or mathematical inverse of the algorithm utilized by the SIP server to generate the To-Tag in an outgoing SIP response message or the From-Tag in an outgoing SIP request message.

8. The SIP Server as recited in claim 7, wherein the selected B2BUA instance includes a processor element programmed to:

generate a From-Tag in the outgoing SIP message based on the Routing-Key utilizing a generation algorithm when the outgoing SIP message is a request message, wherein the generation algorithm is an algorithmic and/or mathematical inverse of a retrieval algorithm utilized by the SIP server to retrieve the Routing-Key from the To-Tag, when present, in the incoming SIP request message; and generate a To-Tag in the outgoing SIP message based on the Routing-Key utilizing a generation algorithm when the outgoing SIP message is a response message, wherein the generation algorithm is an algorithmic and/or mathematical inverse of a retrieval algorithm utilized by the SIP server to retrieve the Routing-Key from the From-Tag in the incoming SIP response message.

* * * * *

UNITED STATES PATENT AND TRADEMARK OFFICE
CERTIFICATE OF CORRECTION

| | | |
|---|---|---|
| PATENT NO. | : 8,364,828 B2 | Page 1 of 1 |
| APPLICATION NO. | : 12/837951 | |
| DATED | : January 29, 2013 | |
| INVENTOR(S) | : Samavedam et al. | |

It is certified that error appears in the above-identified patent and that said Letters Patent is hereby corrected as shown below:

IN THE CLAIMS:

In Column 9, Line 24, in Claim 1, delete "both:" and insert -- both; --, therefor.

Signed and Sealed this
Ninth Day of April, 2013

Teresa Stanek Rea
*Acting Director of the United States Patent and Trademark Office*